United States Patent
Toba et al.

(10) Patent No.: US 10,995,235 B2
(45) Date of Patent: May 4, 2021

(54) COMPOSITION FOR FORMING PROTECTIVE FILM FOR ELECTROCONDUCTIVE PATTERN, PROTECTIVE FILM FOR ELECTROCONDUCTIVE PATTERN, METHOD FOR PRODUCING PROTECTIVE FILM, AND METHOD FOR PRODUCING TRANSPARENT ELECTROCONDUCTIVE FILM

(71) Applicant: SHOWA DENKO K.K., Tokyo (JP)

(72) Inventors: Masahiko Toba, Tokyo (JP); Eri Nakazawa, Tokyo (JP); Shigeru Yamaki, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/465,400

(22) PCT Filed: Nov. 29, 2017

(86) PCT No.: PCT/JP2017/042822
§ 371 (c)(1),
(2) Date: May 30, 2019

(87) PCT Pub. No.: WO2018/101333
PCT Pub. Date: Jun. 7, 2018

(65) Prior Publication Data
US 2019/0330493 A1 Oct. 31, 2019

(30) Foreign Application Priority Data

Dec. 1, 2016 (JP) .............................. JP2016-234241

(51) Int. Cl.
C09D 175/04 (2006.01)
C09D 7/20 (2018.01)
B05D 3/02 (2006.01)
H01B 1/12 (2006.01)

(52) U.S. Cl.
CPC .......... C09D 175/04 (2013.01); B05D 3/0254 (2013.01); C09D 7/20 (2018.01); H01B 1/124 (2013.01)

(58) Field of Classification Search
CPC ................................ C09D 175/04; C09D 7/20
See application file for complete search history.

(56) References Cited

U.S. PATENT DOCUMENTS

| | | | |
|---|---|---|---|
| 2008/0143906 A1 | 6/2008 | Allemand et al. | |
| 2009/0093595 A1* | 4/2009 | Kimura | C09D 175/04 525/450 |
| 2011/0024159 A1 | 2/2011 | Allemand et al. | |
| 2011/0253426 A1* | 10/2011 | Ooga | C08G 18/44 174/254 |
| 2013/0052434 A1* | 2/2013 | Asahi | G02B 1/16 428/212 |
| 2013/0146346 A1 | 6/2013 | Nakamoto et al. | |
| 2013/0216826 A1 | 8/2013 | Nakamoto et al. | |
| 2015/0144380 A1 | 5/2015 | Yang et al. | |
| 2019/0010339 A1* | 1/2019 | Mitsumoto | B05D 1/02 |

FOREIGN PATENT DOCUMENTS

| | | |
|---|---|---|
| JP | 2010-507199 A | 3/2010 |
| JP | 2011-29098 A | 2/2011 |
| JP | 2011137108 A * | 7/2011 |
| JP | 2013-140329 A | 7/2013 |
| JP | 2013-170210 A | 9/2013 |
| JP | 2015-18824 A | 1/2015 |
| JP | 2015-24550 A | 2/2015 |
| JP | 2016-119305 A | 6/2016 |
| JP | 2016-135850 A | 7/2016 |
| WO | 2007/097405 A1 | 8/2007 |
| WO | 2016/038898 A1 | 3/2016 |

OTHER PUBLICATIONS

JP-2011137108_Jul. 2011_English Translation.*
Notification of Reason for Refusal dated Feb. 28, 2019, issued by the Korean Paten Office in Application No. 10-2019-7003751.
International Search Report for PCT/JP2017/042822 dated Feb. 6, 2018 [PCT/ISA/210].

* cited by examiner

*Primary Examiner* — Michael L Leonard
(74) *Attorney, Agent, or Firm* — Sughrue Mion, PLLC

(57) ABSTRACT

A composition for a protective film for electroconductive patterns, including: (A) a polyurethane containing a carboxyl group; (B) an epoxy compound; (C) a curing accelerator; and (D) a solvent, wherein the percentage of the solvent (D) contained is from 95.0% to 99.9% by mass, and the solvent (D) contains (D1) a solvent containing a hydroxyl group and having a boiling point in excess of 100° C., and (D2) a solvent having a boiling point that does not exceed 100° C., wherein the content of the solvent (D2) having a boiling point that does not exceed 100° C. is 30% to less than 70% by mass of total solvent in total. The composition can be cured by heating at a temperature not exceeding 100° C. for a heating time not exceeding 10 minutes.

13 Claims, No Drawings

COMPOSITION FOR FORMING PROTECTIVE FILM FOR ELECTROCONDUCTIVE PATTERN, PROTECTIVE FILM FOR ELECTROCONDUCTIVE PATTERN, METHOD FOR PRODUCING PROTECTIVE FILM, AND METHOD FOR PRODUCING TRANSPARENT ELECTROCONDUCTIVE FILM

CROSS REFERENCE TO RELATED APPLICATIONS

This application is a National Stage of International Application No. PCT/JP2017/042822, filed on Nov. 29, 2017, which claims priority from Japanese Patent Application No. 2016-234241, filed on Dec. 1, 2016.

TECHNICAL FIELD

The present disclosure relates to a composition for a protective film for a conductive pattern, a protective film for a conductive pattern, a method for producing a protective film, and a method for producing a transparent conductive film.

BACKGROUND ART

A transparent conductive film is used in various fields such as a transparent electrode for a liquid crystal display (LCD), a plasma display panel (PDP), an organic electroluminescence type display, photovoltaic cell (PV), and a touch panel (TP), an electro-static discharge (ESD) film, and an electromagnetic interference (EMI) film, etc. For these transparent conductive films, conventionally, a film using ITO (Indium Tin Oxide) has been used. However, there are drawbacks that the supply stability of indium is low, the production cost is high, the flexibility is inferior, and a high temperature is required when the film is formed. Therefore, transparent conductive films which can replace the ITO film has been actively searched. Among such films, a transparent conductive film containing metal nanowires is preferable as a transparent conductive film substituting the ITO film, in view of its superior conductivity, optical property, and flexibility, and its advantages that a film can be formed by a wet process, a production cost is low, and a high temperature is not required at the time of forming a film, and the like. For example, a transparent conductive film containing silver nanowires, and having a superior conductivity, optical property, and flexibility is known (refer to Patent Document 1).

However, there are drawbacks that the transparent conductive film containing silver nanowires has a large surface area per mass of silver, and thus, can easily react with various compounds, leading to low environmental tolerance. Due to influences from various medical agents or cleaning solutions used in the processes, or influences from oxygen or moisture in the air to which the film is exposed during the long-term storage, the nano structure is corroded, resulting in the decrease in conductivity. Further, in particular, when the film is used for electronic materials, in order to prevent adhesion or mixture of fine particle-like impurities, dust and dirt, etc., onto a substrate surface, a physical cleaning process using a brush, etc., is often performed. However, the damage on to the surface due to this physical cleaning may also be a problem.

In order to solve the drawbacks, there have been many attempts of providing a protective film on the surface of the transparent conductive film having silver nanowires to apply hardness and environmental tolerance to the transparent conductive film. Also, because electrical connection between the wirings of an electronic circuit and the transparent conductive film is required, there is a desire for a protective film capable of maintaining electrical contact from the protective film surface to the transparent conductive film.

In order to solve these drawbacks, various considerations have been made for the protective layer of the transparent conductive film. For example, Patent Document 2 proposes a method for protecting a transparent conductive film using a specific thermosetting composition, wherein a thin protective layer is provided to maintain the electrical contact. However, according to the examples in Patent Document 2 (Step 2), preliminary drying is performed at 80° C. for 3 minutes and the step of thermal setting of the thermosetting composition is performed at 100° C. for 15 or more minutes. Thus, the productivity is not good.

Further, Patent Document 3 discloses the film forming using a protective film composition containing a corrosion inhibitor, at a high temperature of 150° C., to thereby increase the environmental tolerance. During the film forming, the protective film is exposed to the high temperature of 150° C., thus, there is a concern that several problems such as generation of distortion, decrease of optical properties, etc., may occur, depending on the material used.

PRIOR ARTS

Patent Document 1: Japanese Unexamined Patent Publication (Kohyo) 2010-507199
Patent Document 2: Japanese Unexamined Patent Publication (Kokai) 2013-170210
Patent Document 3: Japanese Unexamined Patent Publication (Kokai) 2015-18824

SUMMARY

In view of the above technical background, one of the objectives of the present disclosure is to provide a composition for a protective film for a conductive pattern, capable of forming the protective film which has a superior optical property, maintains an electrical contact with a transparent conductive film containing silver nanowires, and applies high environmental tolerance to the transparent conductive film, at a low energy and for a short time, as well as a protective film for a conductive pattern, a protective film production method, and a transparent conductive film production method.

In order to attain the above objective, the present disclosure contains the following aspects.

[1] A composition for a protective film for a conductive pattern, comprising (A) a polyurethane containing a carboxyl group, (B) an epoxy compound, (C) a curing accelerator, and (D) a solvent, wherein the content of the solvent (D) is 95.0% by mass or more and 99.9% by mass or less, (D) comprises (D1) and (D2), (D1) being a solvent having boiling point exceeding 100° C. and containing a hydroxyl group, (D2) being a solvent having a boiling point of 100° C. or lower, and the content of (D2) solvent having the boiling point of 100° C. or lower is 30% by mass or more and less than 70% by mass of the solvent in total.

[2] A composition for a protective film for a conductive pattern according to [1] wherein (D1) solvent having a boiling point exceeding 100° C. and containing a hydroxyl group is at least one selected from a group consisting of propylene glycol monomethyl ether, diethylene glycol monomethyl ether, diethylene glycol monoethyl ether, diethylene glycol monobutyl ether, triethylene glycol, and ethyl lactate.

[3] A composition for a protective film for a conductive pattern according to [1] or [2], wherein (D2) solvent having the boiling point 100° C. or lower is at least one selected from a group consisting of propylene glycol dimethyl ether, isopropyl alcohol, t-butyl alcohol, and methyl ethyl ketone.

[4] A composition for a protective film for a conductive pattern according to [2], wherein (D1) solvent having the boiling point exceeding 100° C. and containing a hydroxyl group is at least one of diethylene glycol monoethyl ether (EC) and propylene glycol monomethyl ether (PGME).

[5] A composition for a protective film for a conductive pattern according to [3], wherein (D2) solvent having the boiling point of 100° C. or lower is isopropyl alcohol (IPA).

[6] A protective film for a conductive pattern which is made of a cured product of the composition for the protective film for the conductive pattern according to any one of [1] to [5], and which has a degree of cure of 45 or more.

[7] A method for producing a protective film, wherein the composition for the protective film for the conductive pattern according to any one of [1] to [5] is cured at a temperature of 100° C. or lower and for a heating time of 10 minutes or less.

[8] A method for producing a transparent conductive film comprising a step of forming the protective film on the transparent conductive film by the method according to [7].

According to the present disclosure, a composition for a protective film for a conductive pattern capable of forming the protective film which has a superior optical property, maintains an electrical contact with a transparent conductive film containing silver nanowires, and applies high environmental tolerance to the transparent conductive film, at a low energy and for a short time, as well as a protective film for a conductive pattern, a protective film production method, and a transparent conductive film production method, can be provided.

ASPECT OF DISCLOSURE

Hereinbelow, aspects of the present disclosure (hereinbelow, referred to as aspects) will be explained.

In the present specification, (meth)acrylate refers to acrylate or methacrylate, and (meth)acryloyl refers to acryloyl or methacryloyl, respectively.

A composition for a protective film for a conductive pattern according to the present aspect (hereinbelow, may be referred to as a protective film ink) comprises (A) a polyurethane containing a carboxyl group, (B) an epoxy compound, (C) a curing accelerator, and (D) a solvent, wherein the content of the solvent (D) is 95.0% by mass or more and 99.9% by mass or less, (D) comprises (D1) and (D2), (D1) being a solvent having a boiling point exceeding 100° C. and containing a hydroxyl group, (D2) being a solvent having a boiling point of 100° C. or lower, and the content of the solvent (D2) having a boiling point of 100° C. or lower is 30% by mass or more and less than 70% by mass of the total solvents.

The (A) polyurethane having a carboxyl group has a number average molecular weight of preferably 1,000 to 100,000, more preferably 2,000 to 70,000, and still more preferably 3,000 to 50,000. Here, the molecular weight is a polystyrene equivalent value measured by gel permeation chromatography (hereinbelow, referred to as GPC). If the molecular weight is less than 1,000, the elongation property, the flexibility, and the strength of the printed film may be decreased. Whereas, if the molecular weight exceeds 100,000, the solubility of polyurethane to the solvent is decreased, and even when polyurethane can dissolve in the solvent, the viscosity becomes too high, which may cause great limitations in use.

In the present specification, the measurement conditions of GPC are as follows, unless specifically described:

Device Name: HPLC unit HSS-2000, manufactured by JASCO Corporation

Column: Shodex Column LF-804

Mobile Phase: tetrahydrofuran

Flow Rate: 1.0 mL/min

Detector: RI-2031 Plus manufactured by JASCO Corporation

Temperature: 40.0° C.

Sample Volume: sample loop 100 µL

Sample Concentration: Prepared to approximately 0.1% by mass

The (A) polyurethane containing a carboxyl group has an acid value of preferably 10 to 140 mg-KOH/g, and more preferably 15 to 130 mg-KOH/g. If the acid value is less than 10 mg-KOH/g, the curing property is decreased, and the solvent resistance becomes worse. Whereas, if the acid value exceeds 140 mg-KOH/g, the solubility to the solvent as a urethane resin decreases, and even when the urethane resin can dissolve in the solvent, the viscosity becomes too high, which makes the handling difficult. In addition, the cured product becomes too hard, which may cause problems such as warpage, etc., depending on the base film.

Further, in the present specification, the acid value of a resin is a value measured by the following method.

Approximately 0.2 g of sample is precisely weighed by a precision balance into a 100 ml Erlenmeyer flask, and 10 ml of a mixture solvent of ethanol/toluene=1/2 (mass ratio) is provided thereto to dissolve the sample. Further, 1 to 3 drops of a phenolphthalein ethanol solution is added to the container as an indicator, which is sufficiently stirred until the sample becomes uniform. The resultant is subjected to titration with a 0.1 N potassium hydroxide ethanol solution. When the indicator continues to be in light red for 30 seconds, it is determined that the neutralization ends. The value obtained from the result using the following calculation formula is treated as an acid value of the resin.

$$\text{Acid Value (mg-KOH/g)} = [B \times f \times 5.611]/S$$

B: Use amount (ml) of 0.1 N potassium hydroxide ethanol solution f: Factor of 0.1 N potassium hydroxide ethanol solution S: Collection quantity (g) of sample More specifically, the polyurethane (A) containing a carboxyl group is polyurethane synthesized by using (a1) a polyisocyanate compound, (a2) a polyol compound, and (a3) a dihydroxy compound containing a carboxyl group, as monomers. Hereinbelow, each monomer will be explained in more detail.

(a1) Polyisocyanate Compound

For (a1) polyisocyanate compound, usually, diisocyanate which has two isocyanato groups per molecule is used. Examples of the polyisocyanate compound include: aliphatic polyisocyanate, alicyclic polyisocyanate, aromatic polyisocyanate, aromatic-aliphatic polyisocyanate, and the like. One of them may be used by itself, or two or more of them may be used in combination. As far as (A) polyurethane containing a carboxyl group is not turned into a gel, a small amount of polyisocyanate having three or more isocyanato groups such as triphenylmethane triisocyanate, may be used.

Examples of the aliphatic polyisocyanate include: 1,3-trimethylene diisocyanate, 1,4-tetramethylene diisocyanate, 1,6-hexamethylene diisocyanate, 1,9-nonamethylene diisocyanate, 1,10-decamethylene diisocyanate, 2,2,4-trimethylhexamethylene diisocyanate, 2,4,4-trimethylhexamethylene diisocyanate, lysine diisocyanate, 2,2'-diethyl ether diisocyanate, dimer acid diisocyanate, and the like.

Examples of the alicyclic polyisocyanate include: 1,4-cyclohexane diisocyanate, 1,3-bis(isocyanatomethyl)cyclohexane, 1,4-bis(isocyanatomethyl)cyclohexane, 3-isocyanatomethyl-3,3,5-trimethylcyclohexane (IPDI, isophorone diisocyanate), bis(4-isocyanato cyclohexyl)methane (Hydrogenated MDI), hydrogenated (1,3- or 1,4-)xylylene diisocyanate, norbornane diisocyanate, and the like.

Examples of the aromatic polyisocyanate include: 2,4'-diphenyl methane diisocyanate, 4,4'-diphenyl methane diisocyanate, 1,4-phenylene diisocyanate, 2,4-tolylene diisocyanate, 2,6-tolylene diisocyanate, (1,2, 1,3, or 1,4)-xylene diisocyanate, 4,4'-diisocyanato-3,3'-dimethylbiphenyl, 3,3'-dimethyl diphenyl methane-4,4'-diisocyanate, 1,5-naphthylene diisocyanate, 4,4'-diphenyl ether diisocyanate, tetrachlorophenylene diisocyanate, and the like.

Examples of the aromatic-aliphatic polyisocyanate include: 1,3-xylylene diisocyanate, 1,4-xylylene diisocyanate, α,α,α',α'-tetramethyl xylylene diisocyanate, 3,3'-methylene ditolylene-4,4'-diisocyanate, and the like.

Here, if an alicyclic compound having 6 to 30 carbon atoms other than the carbon atoms in the isocyanato group (—NCO group) is used as (a1) polyisocyanate compound, a protective film formed by the polyurethane resin according to the present aspect has high reliability particularly under high temperature and high humidity, and is suitable as a member for an electronic device component.

From the viewpoint of weather resistance, as for (a1) polyisocyanate compound, using a compound which does not have an aromatic ring is preferable. The content of the aromatic polyisocyanate and the aromatic-aliphatic polyisocyanate is preferably 50 mol % or less, more preferably 30 mol % or less, and still more preferably 10 mol % or less, relative to the total amount (100 mol %) of (a1) polyisocyanate compound.

The alicyclic compound may be 1,4-cyclohexane diisocyanate, isophorone diisocyanate, bis(4-isocyanato cyclohexyl) methane, 1,3-bis(isocyanatomethyl) cyclohexane, 1,4-bis(isocyanatomethyl) cyclohexane, and the like.

(a2) Polyol Compound

The number average molecular weight of (a2) polyol compound (with the proviso that (a2) polyol compound does not include (a3) dihydroxy compound having a carboxyl group) is usually 250 to 50,000, preferably 400 to 10,000, and more preferably 500 to 5,000. The molecular weight is a polystyrene equivalent value measured by the GPC under the above-mentioned conditions.

Examples of (a2) polyol compound include: polycarbonate polyol, polyether polyol, polyester polyol, polylactone polyol, polybutadiene polyol, polysilicone having hydroxyl groups at both ends, and a polyol compound having 18 to 72 carbon atoms obtained by adding hydrogen to a polycarboxilic acid derived from a C18 (carbon atom number 18) unsaturated fatty acid made from vegetable oil and a polymer thereof, and converting the carboxylic acid into hydroxyl groups. Among them, in view of the balance of the water resistance, the insulation reliability, and the adhesion to a base material, polycarbonate polyol and polybutadiene polyol are preferable.

The polycarbonate polyol can be obtained from diol having 3 to 18 carbon atoms as a raw material, through reaction with carbonate ester or phosgene, and can be represented by, for example, the following structural formula (1):

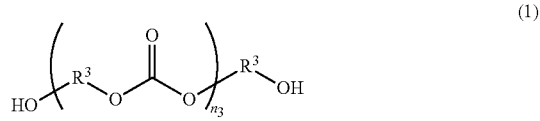

In Formula (1), $R^3$ represents a residue after removing a hydroxyl group from a corresponding diol (HO—$R^3$—OH), $n_3$ represents a positive integer, which is preferably 2 to 50.

Specific examples of the raw material used for producing the polycarbonate polyol represented by Formula (1) include: 1,3-propanediol, 1,4-butanediol, 1,5-pentanediol, 1,6-hexanediol, 3 methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, and 1,2-tetradecanediol, etc.

The polycarbonate polyol may be a polycarbonate polyol (copolymerized polycarbonate polyol) having a plurality of types of alkylene groups in its skeleton. Using a copolymerized polycarbonate polyol is advantageous in many cases from the viewpoint of preventing crystallization of (A) polyurethane containing a carboxyl group. Further, taking the solubility to the solvent into account, using, in combination, a polycarbonate polyol having a branched skeleton and having hydroxyl groups at the ends of the branched chains, is preferable.

The polyether polyol is obtained by the dehydration condensation of a diol having 2 to 12 carbon atoms, or the ring-opening polymerization of an oxirane compound, oxetane compound, or tetrahydrofuran compound having 2 to 12 carbon atoms, and may be represented by, for example, the following structural formula (2):

In Formula (2), $R^4$ represents a residue obtained by removing a hydroxyl group from a corresponding diol (HO—$R^4$—OH), $n_4$ represents a positive integer, which is preferably 4 to 50. One type of the diol having 2 to 12 carbon atoms may be used by itself to form a homopolymer, or two or more types may be used in combination to form a copolymer.

Specific examples of the polyether polyol represented by the above Formula (2) include: polyalkylene glycols such as polyethylene glycol, polypropylene glycol, poly-1,2-butylene glycol, polytetramethylene glycol (poly 1,4-butanediol), poly-3-methyltetramethylene glycol, polyneopentyl glycol, and the like. Further, in order to increase the hydrophobic property of the polyether polyol, a copolymer of these, for example, a copolymer of 1,4-butanediol and neopentyl glycol, etc., may be used.

The polyester polyol may be obtained by a transesterification of diol with a dehydration condensation product of a dicarboxylic acid and a diol, or a transesterification of diol with an ester of a dicarboxylic acid and a lower alcohol, and may be represented by, for example, the following structural formula (3):

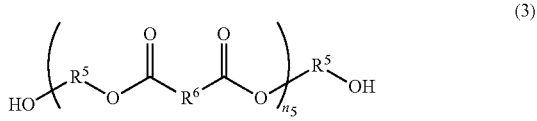

(3)

In Formula (3), $R^5$ represents a residue obtained by removing a hydroxyl group from the corresponding diol (HO—$R^5$—OH), $R^6$ represents a residue obtained by removing two carboxyl groups from the corresponding dicarboxylic acid (HOCO—$R^6$—COOH), $n_5$ represents a positive integer, which is preferably 2 to 50.

Specific examples of the diol (HO—$R^5$—OH) include: ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, or 1,2-tetradecanediol, 2,4-diethyl-1,5-pentanediol, butyl ethyl propanediol, 1,3-cyclohexanedimethanol, 3-xylylene glycol, 1,4-xylylene glycol, diethylene glycol, triethylene glycol, dipropylene glycol, and the like.

Specific examples of the dicarboxylic acid (HOCO—$R^6$—COOH) include: succinic acid, glutaric acid, adipic acid, azelaic acid, sebacic acid, decane dicarboxylic acid, brasylic acid, 1,4-cyclohexane dicarboxylic acid, hexahydrophthalic acid, methyl tetrahydrophthalic acid, endomethylene tetrahydrophthalic acid, methyl endomethylene tetrahydrophthalic acid, chlorendic acid, fumaric acid, maleic acid, itaconic acid, citraconic acid, phthalic acid, isophthalic acid, terephthalic acid, 1,4-naphthalene dicarboxylic acid, 2,6-naphthalene dicarboxylic acid.

The polylactone polyol may be obtained by the condensation reaction of a ring-opening polymerized lactone and a diol, or the condensation reaction of a diol and a hydroxy alkanoic acid, and may be represented by, for example, the following structural formula (4):

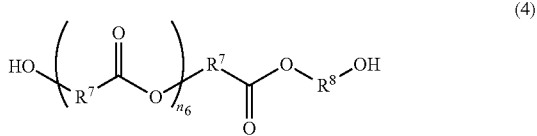

(4)

In Formula (4), $R^7$ represents a residue obtained by removing a hydroxyl group and a carboxyl group from a corresponding hydroxy alkanoic acid (HO—$R^7$—COOH), $R^8$ represents a residue obtained by removing a hydroxyl group from a corresponding diol (HO—$R^8$—OH), $n_6$ is a positive integer, which is preferably 2 to 50.

Specific examples of the hydroxy alkanoic acid (HO—$R^7$—COOH) include: 3-hydroxybutanoic acid, 4-hydroxypentanoic acid, 5-hydroxyhexanoic acid, and the like. Examples of lactone include ε-caprolactone.

The polybutadiene polyol is, for example, a diol obtained by polymerizing butadiene or isoprene by anion polymerization, and then introducing hydroxyl groups to both ends, or a diol obtained by hydrogen reduction of the double bonds thereof.

Specific examples of the polybutadiene polyol include: hydroxylated polybutadiene mainly having a 1,4-repeating unit (for example, Poly bd R-45HT, Poly bd R-15HT (manufactured by Idemitsu Kosan Co., Ltd.)), hydroxylated hydrogenated polybutadiene (for example, POLYTAIL H, POLYTAIL HA (manufactured by Mitsubishi Chemical Corporation), hydroxylated polybutadiene mainly having a 1,2-repeating unit (for example, G-1000, G-2000, G-3000 (manufactured by Nippon Soda Co., Ltd.)), hydroxylated hydrogenated polybutadiene (for example, GI-1000, GI-2000, GI-3000 (manufactured by Nippon Soda Co., Ltd.)), hydroxylated polyisoprene (for example, Poly IP (manufactured by Idemitsu Kosan Co., Ltd.)), hydroxylated hydrogenated polyisoprene (for example, EPOL (manufactured by Idemitsu Kosan Co., Ltd.)).

The polysilicone having hydroxyl terminal groups at both ends may be represented by, for example, the following structural formula (5):

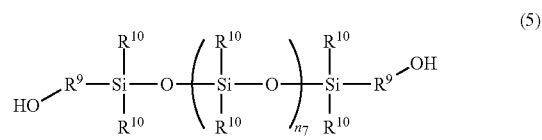

(5)

In Formula (5), $R^9$ independently represents a divalent aliphatic hydrocarbon residue or a divalent aromatic hydrocarbon residue having 2 to carbon atoms, $n_7$ is a positive integer, which is preferably 2 to 50. $R^9$ may include an ether group. Each of a plurality of $R^{10}$ independently represents an aliphatic hydrocarbon group or an aromatic hydrocarbon group having 1 to 12 carbon atoms.

Market products of the polysilicone having hydroxyl groups at both ends include, for example, "X-22-160AS, KF6001, KF6002, KF-6003" manufactured by Shin-Etsu Chemical Co., Ltd., and the like.

Specific examples of the "polyol compound having 18 to 72 carbon atoms obtained by adding hydrogen to a polycarboxilic acid derived from a C18 unsaturated fatty acid made from vegetable oil and a polymer thereof, and converting the carboxylic acid into hydroxyl groups" include a diol compound having a skeleton of a hydrogenated dimer acid, and a marketed product thereof is, for example, "Sovermol (registered trademark) 908" manufactured by Cognis.

As far as the effect of the present disclosure is not ruined, a diol having a molecular weight of 300 or less, which is usually used as a diol component for synthesizing polyester or polycarbonate may be used as (a2) polyol compound. Specific examples of such a low molecular weight diol include: ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, 1,2-tetradecanediol, 2,4-diethyl-1,5-pentanediol, butyl ethyl propanediol, 1,3-cyclohexanedimethanol, 1,3-xylylene glycol, 1,4-xylylene glycol, diethylene glycol, triethylene glycol, and dipropylene glycol, and the like.

(a3) Dihydroxy Compound Containing Carboxyl Group

Preferably, (a3) a dihydroxy compound containing a carboxyl group is a carboxylic acid or an amino carboxylic acid having a molecular weight of 200 or less, and having two groups selected from a hydroxy group, a hydroxyalkyl group with one carbon, and a hydroxyalkyl group with 2 carbons, because a cross linking point is controllable. Specific examples include: 2,2-dimethylolpropionic acid, 2,2-dimethylolbutanoic acid, N,N-bis hydroxyethyl glycine, N,N-bis hydroxyethyl alanine, and the like. Among them, in view of the solubility to the solvent, 2,2-dimethylolpropionic acid, 2,2-dimethylolbutanoic acid are particularly preferable. One type of the compounds of (a3) dihydroxy compound containing a carboxyl group can be used by itself, or two or more types may be used in combination.

The above-mentioned (A) a polyurethane containing a carboxyl group can be synthesized from the above three components ((a1), (a2), and (a3)) only. However, (a4) a monohydroxy compound and/or (a5) a monoisocyanate compound may be further reacted for synthesis.

(a4) Monohydroxy Compound

Examples of (a4) monohydroxy compound include: a compound having a radical polymerizable double bond, such as 2-hydroxyethyl (meth)acrylate, hydroxypropyl (meth)acrylate, 4-hydroxybutyl (meth)acrylate, cyclohexanedimethanol mono(meth)acrylate, a caprolactone adduct or an alkylene oxide adduct of each of the above (meth)acrylates, glycerin di(meth)acrylate, trimethylol di(meth)acrylate, pentaerythritol tri(meth)acrylate, dipentaerythritol penta(meth)acrylate, ditrimethylol propane tri (meth)acrylate, allyl alcohol, allyloxy ethanol, etc., and a compound having a carboxylic group such as a glycolic acid, a hydroxypivalic acid, etc.

One type of (a4) monohydroxy compound can be used by itself, or two or more types of (a4) can be used in combination. Among these compounds, 2-hydroxyethyl (meth) acrylate, hydroxypropyl (meth)acrylate, hydroxybutyl (meth)acrylate, allyl alcohol, glycolic acid, hydroxypivalic acid are preferable, and 2-hydroxyethyl (meth)acrylate and 4-hydroxybutyl (meth)acrylate are more prefer[able.

Other examples of (a4) monohydroxy compound include: methanol, ethanol, n-propanol, isopropanol, n-butanol, isobutanol, sec-butanol, t-butanol, amyl alcohol, hexyl alcohol, octyl alcohol, and the like.

(a5) Monoisocyanate Compound

Examples of (a5) monoisocyanate compound include: (meth)acryloyloxyethyl isocyanate, phenyl isocyanate, hexyl isocyanate, dodecyl isocyanate, Karenz (registered trademark) MOI, Karenz (registered trademark) AOI, Karenz (registered trademark) BEI (manufactured by Showa Denko K. K.).

The above-mentioned (A) polyurethane containing a carboxyl group can be synthesized by reacting the above-mentioned (a1) polyisocyanate compound, (a2) polyol compound, (a3) dihydroxy compound containing a carboxyl group, and in accordance with needs, (a4) monohydroxy compound and (a5) monoisocyanate compound, under the presence or absence of a known urethanization catalyst such as dibutyltin dilaurate, using an appropriate organic solvent. However, performing reaction without a catalyst is preferable because there would be no need to concern about the mixing of tin, etc., in the final product.

The organic solvent is not particularly limited as far as the reactivity with the isocyanate compound is low, but a preferable solvent is a solvent free from a basic functional group such as amine, etc., and having a boiling point of 50° C. or higher, preferably 80° C. or higher, and more preferably 100° C. or higher. Examples of such a solvent include: toluene, xylene, ethylbenzene, nitrobenzene, cyclohexane, isophorone, diethylene glycol dimethyl ether, ethylene glycol diethyl ether, ethylene glycol monomethyl ether acetate, propylene glycol monomethyl ether acetate, propylene glycol monoethyl ether acetate, dipropylene glycol monomethyl ether acetate, diethylene glycol monoethyl ether acetate, methoxypropionic acid methyl, methoxypropionic acid ethyl, ethoxypropionic acid methyl, ethoxypropionic acid ethyl, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, γ-butyrolactone, dimethyl sulfoxide, and the like.

Taking into account that it is not preferable to use an organic solvent in which the polyurethane to be generated does not dissolve well, and that the polyurethane is used as a raw material for the protective film ink used for an electronic material, propylene glycol monomethyl ether acetate, propylene glycol monoethyl ether acetate, dipropylene glycol monomethyl ether acetate, diethylene glycol monoethyl ether acetate, γ-butyrolactone, etc., are particularly preferable among the above.

The addition sequence of the raw materials is not limited, but usually, first, (a2) polyol compound and (a3) dihydroxy compound having a carboxyl group are provided, and dissolved or dispersed in the solvent, and thereafter, (a1) polyisocyanate compound is added by dropping at 20 to 150° C., and more preferably at 60 to 120° C., which is then reacted at 30 to 160° C., and preferably at 50 to 130° C.

The molar ratio of the added raw materials is adjusted in accordance with the molecular weight and the acid value of the objected polyurethane. In case that (a4) monohydroxy compound is introduced to polyurethane, in order that the polyurethane molecule has an isocyanato group at the end, (a1) polyisocyanate compound must be used in excess of the sum of (a2) polyol compound and (a3) dihydroxy compound having a carboxyl group (isocyanato groups in total should be in excess of the hydroxyl groups in total). In case that (a5) monoisocyanate compound is introduced to polyurethane, in order that the polyurethane molecule has a hydroxy group at the end, (a1) polyisocyanate compound should be used less than the sum of (a2) polyol compound and (a3) dihydroxy compound having a carboxyl group (isocyanato groups in total should be less than hydroxyl groups in total).

Specifically, the molar ratio of the provided materials is that isocyanato group of (a1) polyisocyanate compound: (hydroxyl group of (a2) polyol compound+hydroxyl group of (a3) dihydroxy compound having a carboxyl group) is 0.5 to 1.5:1, preferably 0.8 to 1.2:1, and more preferably 0.95 to 1.05:1.

Further, hydroxyl group of (a2) polyol compound:hydroxyl group (a3) dihydroxy compound having a carboxyl group is 1:0.1 to 30, and preferably 1:0.3 to 10.

When (a4) monohydroxy compound is used, the molar number of (a1) polyisocyanate compound should be in excess of the molar number of ((a2) polyol compound+(a3) dihydroxy compound having a carboxyl group), and 0.5 to 1.5 times of molar amount, preferably 0.8 to 1.2 times of molar amount of (a4) monohydroxy compound is used, relative to the excess molar number of the isocyanato group.

When (a5) monoisocyanate compound is used, the molar number of ((a2)polyol compound+(a3) dihydroxy compound having a carboxyl group) should be in excess of the molar number of (a1) polyisocyanate compound, and 0.5 to 1.5 times of molar amount, preferably 0.8 to 1.2 times of molar amount of (a5) monoisocyanate compound is used, relative to the excess molar number of the hydroxyl group.

In order to introduce (a4) monohydroxy compound to (A) polyurethane containing a carboxyl group, when the reaction of (a2) polyol compound and (a3) dihydroxy compound having a carboxyl group with (a1) polyisocyanate compound is almost complete, (a4) monohydroxy compound is dropped to the reaction solution at 20 to 150° C., and more preferably at 70 to 120° C., to react the isocyanato groups remaining at both ends of (A) polyurethane containing a carboxyl group with (a4) monohydroxy compound, and the temperature is maintained until the end of the reaction.

In order to introduce (a5) monoisocyanate compound to (A) polyurethane containing a carboxyl group, when the reaction of (a2) polyol compound and (a3) dihydroxy compound having a carboxyl group with (a1) polyisocyanate compound is almost complete, (a5) monoisocyanate compound is dropped to the reaction solution at 20 to 150° C., and more preferably at 50 to 120° C., to react the hydroxyl groups remaining at both ends of (A) polyurethane containing a carboxyl group with (a5) monoisocyanate compound, and the temperature is maintained until the end of the reaction.

<Protective Film Ink>

The above mentioned (A) polyurethane containing a carboxyl group, (B) epoxy compound, (C) curing accelerator, and (D) solvent are mixed so that the content of (D) solvent becomes 95.0% by mass or more and 99.9% by mass or less, and stirred until being uniform, to obtain a protective film ink.

Examples of (B) epoxy compound include an epoxy compound having two or more epoxy groups in one molecule, such as bisphenol-A type epoxy compound, a polyfunctional alicyclic epoxy compound such as Celloxide (registered trademark) 2021P (manufactured by Daicel Corporation), Celloxide 2081 (manufactured by Daicel Corporation), EHPE (registered trademark) 3150 (manufactured by Daicel Corporation), YX8000 (manufactured by Mitsubishi Chemical Corporation), YX8034 (manufactured by Mitsubishi Chemical Corporation), hydrogenated bisphenol-A type epoxy resin, bisphenol-F type epoxy resin, novolak type epoxy resin, phenol novolak type epoxy resin, cresol novolak type epoxy resin, N-glycidyl type epoxy resin, bisphenol A novolak type epoxy resin, chelate type epoxy resin, glyoxal type epoxy resin, amino group-containing epoxy resin, rubber-modified epoxy resin, dicyclopentadiene phenolic type epoxy resin, silicone-modified epoxy resin, ε-caprolactone-modified epoxy resin, aliphatic-type epoxy resin containing a glycidyl group, alicyclic epoxy resin containing a glycidyl group, etc.

Further, for example, monofunctional epoxy (meth)acrylate such as glycidyl methacrylate, Cyclomer (registered trademark) M100 (3,4-epoxy cyclohexyl methyl methacrylate: manufactured by Daicel Corporation), etc., may be used. The mixing ratio of (A) polyurethane containing a carboxyl group relative to (B) epoxy compound is preferably 0.5 to 1.5, more preferably 0.7 to 1.3, and still more preferably 0.9 to 1.1, in terms of equivalent ratio of the carboxyl groups of polyurethane relative to the epoxy groups of (B) epoxy compound.

When (B1) a compound having both a (meth)acryloyl group and an epoxy group in a molecule, such as glycidyl (meth)acrylate, is used, (B1) may be reacted with (A) polyurethane containing a carboxyl group, in advance. Namely, —COOH of (A) polyurethane containing a carboxyl group reacts with the epoxy group of (B1) compound having both of (meth)acryloyl group and epoxy group to generate —COO—$CH_2CH(OH)CH_2$—, resulting in bonding of (A) and (B1).

Examples of such a compound (B1) include glycidyl (meth)acrylate, 4-hydroxybutyl (meth)acrylate glycidyl ether, 3,4-epoxy cyclohexyl methyl (meth)acrylate, etc.

The conditions for reacting (A) and (B1) are: providing (B1) and a catalyst for accelerating the reaction between the epoxy group and the carboxylic acid in a solution in which (A) has been synthesized, and heating the resultant at 50° C. to 160° C., and more preferably at 80° C. to 140° C. If the reaction temperature is too low, the reaction rate is too low, and if the reaction temperature is too high, there is risk for gelation.

With respect to the used amounts of (A) and (B1), the carboxyl group of (A) in terms of the equivalent ratio, relative to the epoxy group of (B1) is preferably 0.8 to 2.0, more preferably 0.9 to 2.0, and most preferably 1.0 to 2.0. If the used amount is more than 2.0 equivalent, heat resistance is deteriorated, whereas, if the used amount is less than 0.8 equivalent, some (B1) components cannot react, which makes bad influence on the electric insulation.

As for the reaction atmosphere, the reaction may be performed in an inert gas or air atmosphere. In particular, in view of polymerization inhibition effect, presence of small amount of oxygen is preferable. Performing the reaction under an atmosphere having an oxygen concentration of 5 to 10%, by mixing an inert gas such as nitrogen with air, is preferable.

The reaction catalyst include may be a known catalyst such as a tertiary amine, phosphine compound. Examples of the tertiary amine include: triethylamine, tributylamine, trioctylamine, DBU, DBN, 2,4,6-tris dimethylaminomethyl phenol, and the like. Examples of the phosphine compound include: triphenyl phosphine, triphenyl phosphite, trimethyl phosphine, trimethyl phosphite, etc. With respect to the used amount of the catalyst, if the amount is too small, the effect of addition cannot be obtained, whereas if the amount is too large, the electric insulation is decreased. Therefore, 0.1 to 5% by mass, and preferably 0.5 to 3% by mass of the catalyst is used, relative to the total mass of (A) and (B1).

Further, a polymerization inhibitor may be added in accordance with needs. Examples of the polymerization inhibitor which can be used here include: a monophenol-based compound such as hydroquinone, p-methoxyphenol, 2,6-di-t-butyl-p-cresol, butylated hydroxyanisole, 2,6-di-t-butyl-4-ethylphenol, stearyl-β-(3,5-di-t-butyl-4-hydroxyphenyl)propionate, etc.; a bisphenol-based compound such as 2,2'-methylenebis(4-methyl-6-t-butylphenol), 4,4'-thiobis(3-methyl-6-t-butylphenol), 4,4'-butylidenebis(3-methyl-6-t-butylphenol), etc.; a high molecular phenol-based compound such as 1,3,5-trimethyl-2,4,6-tris(3,5-di-t-butyl-4-hydroxybenzyl)benzene, tetrakis-[methylene-3-(3',5'-di-t-butyl-4'-hydroxy phenyl) propionate]methane, tris (3',5'-di-t-butyl-4'-hydroxybenzyl)-s-triazine-2,4,6-(1H,3H,5H) trione, tocopherol, etc.; a sulfur-based compound such as phenothiazine, dilauryl-3,3'-thiodipropionate, dimyristyl-3, 3'-thiodipropionate, distearyl-3,3'-thiodipropionate, etc.; and a phosphorus-based compound such as triphenyl phosphite, diphenyl isodecyl phosphite, phenyl diisodecyl phosphite, etc. One of them may be used by itself, or two or more types of them may be used in combination. The used amount is preferably 5 parts by mass or less, relative to 100 parts by mass of the sum of (A) component and (B) component. If the amount exceeds 5 parts by mass, there is a risk of deteriorating the heat resistance of the protective film which is a cured product of the composition of the protective film for the conductive pattern according to the present disclosure.

Examples of (C) curing accelerator used for the protective film ink include: a phosphine-based compound such as triphenylphosphine, tributylphosphine (manufactured by Hokko Chemical Industry Co., Ltd.), Curezol (registered trademark) (imidazole-based epoxy resin curing agent: manufactured by Shikoku Chemicals Corporation), 2-phenyl-4-methyl-5-hydroxy methyl imidazole, U-CAT (registered trademark) SA series (DBU salt: manufactured by San-Apro Ltd.), Irgacure (registered trademark) 184, and the like. With respect to the used amount of these, if the amount is too small, the effect of addition cannot be obtained, whereas if the amount is too large, the electric insulation is decreased. Therefore, 0.1 to 10% by mass, and preferably 0.5 to 6% by mass is used, relative to the total mass of (A) and (B).

Further, a curing aid may be used together. The curing aid may be a polyfunctional thiol compound, an oxetane compound, and the like. Examples of the polyfunctional thiol compound include: pentaerythritol tetrakis(3-mercaptopropionate), tris-[(3-mercaptopropionyloxy)-ethyl]-isocyanurate, trimethylolpropane tris(3-mercaptopropionate), Karenz (registered trademark) MT series (manufactured by Showa Denko K. K.), and the like. Examples of the oxetane compound include: ARON OXETANE (registered trademark) series (manufactured by Toagosei Co., Ltd.), ETERNACOLL (registered trademark) OXBP or OXMA (manufactured by Ube Industries Ltd.), and the like. With respect to the used amount, if the amount is too small, the effect of addition cannot be obtained, whereas if the amount is too large, the curing rate becomes too high, resulting in decreasing handling property. Therefore, 0.1 to 10% by mass, and preferably 0.5 to 6% by mass is used, relative to the mass of (B).

The content of (D) solvent used in the protective film ink is 95.0% by mass or more and 99.9% by mass or less. (D) comprises (D1) solvent having the boiling point exceeding 100° C. and containing a hydroxyl group, to which (A) polyurethane having a carboxyl group can easily dissolve, and (D2) solvent having the boiling point of 100° C. or lower. (D) can be a part of the solvent used for synthesizing (A) polyurethane containing a carboxyl group as it is, such as propylene glycol monomethyl ether acetate (boiling point 146° C.), γ-butyrolactone (boiling point 204° C.), diethylene glycol monoethyl ether acetate (boiling point 218° C.), tripropylene glycol dimethyl ether (boiling point 243° C.), and the like. Further, other solvent may be used for (D) in order to adjust the solubility or printability of (A) polyurethane containing a carboxyl group. When other solvent is used, the reaction solvent is distilled away before or after a new solvent is added, to replace the solvent. Taking into account the cumbersomeness of operations and the energy cost, using the solvent used for synthesizing (A) polyurethane containing a carboxyl group as it is, is preferable. Taking the stability of the ink into account, the contained solvent has a boiling point of preferably 80° C. to 300° C., and more preferably 80° C. to 250° C. If the boiling point is lower than 80° C., the ink is easily dried during the printing, which causes unevenness. If the boiling point is higher than 300° C., heat treatment at a high temperature for a long time is required for drying and curing, which is not suitable for industrial production.

Examples of (D1) solvent having the boiling point exceeding 100° C. and containing a hydroxy group in which (A) polyurethane having a carboxyl group can easily dissolve, include: propylene glycol monomethyl ether (boiling point 120° C.), diethylene glycol monomethyl ether (boiling point 194° C.), diethylene glycol monoethyl ether (boiling point 196° C.), diethylene glycol monobutyl ether (boiling point 230° C.), triethylene glycol (boiling point 276° C.), ethyl lactate (boiling point 154° C.), and the like. At least one of them may be used.

Examples of (D2) solvent having the boiling point of 100° C. or lower include: propylene glycol dimethyl ether (boiling point 97° C.), isopropyl alcohol (boiling point 82° C.), t-butyl alcohol (boiling point 82° C.), methyl ethyl ketone (boiling point 80° C.), and the like. At least one of them may be used.

The content of (D1) solvent having the boiling point exceeding 100° C. and containing a hydroxyl group in which (A) polyurethane having a carboxyl group can easily dissolve, is preferably 30% by mass or more, and more preferably 50% by mass or more, relative to the total amount of the solvent. If the content of (D1) solvent having the boiling point exceeding 100° C. and containing a hydroxyl group, is less than 30% by mass, the resin may not completely dissolve at the room temperature, or even if the resin resolves at the room temperature, when the ink is stored at a temperature lower than the room temperature, to become clouded or precipitation may occur. Among solvents satisfying (D1) solvent having the boiling point exceeding 100° C. and containing a hydroxyl group, when a solvent, the solubility of the polyurethane thereto is low (for example, isopropyl alcohol (IPA)) is used, the used amount of such a solvent is preferably less than 70% by mass. The content of (D2) solvent having the boiling point of 100° C. or lower is 30% by mass or more and less than 70% by mass, preferably 35 to 60% by mass, and more preferably 40 to 50% by mass, relative to the solvent in total. If the content of (D2) solvent having the boiling point of 100° C. or lower is 70% by mass or more, the ink may be easily dried during the printing, which easily causes uneven printing. If the content is less than 30% by mass, heat treatment at a high temperature for a long time is required for drying and curing. By using both (D1) solvent having the boiling point exceeding 100° C. and containing a hydroxyl group and (D2) solvent having the boiling point of 100° C. or lower, an ink composition having a preferable solubility of (A) polyurethane having a carboxyl group, and having a preferable printing property, can be obtained.

The solid content in the protective film ink may differ depending on the desired film thickness or printing method, but is preferably 0.1 to 5% by mass, and more preferably 0.5% by mass to 3% by mass. If the solid content is within the range of 0.1 to 5% by mass, when the ink is coated on a transparent conductive film, drawbacks such that the electrical contact cannot be obtained due to the thick film, do not occur, and a protective film having a sufficient environmental tolerance can be obtained.

The above mentioned protective film ink is used for forming a printed pattern on a substrate by a printing method such as a bar-coating method, gravure printing, inkjet printing, slit coating, and the like, which is subjected to heat treatment and photoirradiation in accordance with needs, after the solvent is distilled away, to thereby cure the ink and obtain a conductive pattern for a protective film. By forming the above protective film on the conductive pattern formed on the transparent substrate, a substrate having a transparent conductive pattern using metal nanowires and provided with a protective film, which has a haze of 2% or less and a total light transmittance of 88% or more, can be obtained. In the present specification, the term "transparent" refers to the state that the total light transmittance is 75% or more.

When the protective film ink according to the present disclosure is cured by heating, the heating is performed at the temperature of 100° C. or lower, and for the heating time of 10 minutes or less. The thermally cured protective film preferably has a cure degree of 45 or more. Here, the cure degree can be calculated by the ATR measurement of the cured protective film. Specifically, the cure degree can be calculated from the ratio between the peak intensity around 910 cm$^1$, etc., due to the epoxy group, and the peak intensity which does not relate to the curing reaction. The peak which does not relate to the curing reaction is different depending on the composition of the ink. For example, when a cycloolefin polymer film is used, in view of the depth that the ATR beam goes down, the peak due to the cycloolefin polymer is approximately fixed, and thus, the peak around the 1450 cm$^{-1}$ can be treated as a peak which does not relate to the curing reaction. As for a reference, a sample formed by coating a protective film ink on a cycloolefin polymer film, and removing the solvent by a method without using heat, such as vacuum drying, is measured. The peak intensity at 1450 cm$^{-1}$ is standardized as 1, and the peak intensity A0 of the epoxy group, i.e., the target of the measurement, is obtained. The protective film ink coated under the same conditions of the above reference is heated and cured, and the ATR is measured. Thereafter, the peak intensity at 1450 cm$^{-1}$ is standardized as 1, and the peak intensity At of the epoxy group after heating is obtained. The cure degree can be obtained by the following formula.

Cure Degree (%)=[(A0−At)/A0]×100

When the characteristic absorption band due to the epoxy group overlaps the other peaks, a peak of another appropriate functional group may be used. If there are no appropriate peaks, calculation may be performed with only a peak of a functional group relating to the reaction. The peak intensity when the curing reaction sufficiently progresses is set as B100, the peak intensity of the reference is set as B0, and the peak intensity after predetermined curing conditions is set as Bt. With them, the cure degree can be obtained by the following formula.

Cure Degree (%)=[(Bt−B100)/(B0−B100)]×100

The state that the curing sufficiently progresses can be confirmed by the fact that the wave does not change any more by heating in the ATR measurement.

The transparent substrate on which the conductive pattern is to be formed may be, for example, glass, polyester film, cycloolefin polymer (for example, ZEONOR (registered trademark), manufactured by Zeon Corporation) film, polycarbonate film, and the like.

The conductive pattern is made by forming an ink of nanowires, nanotubes of metal such as silver, copper, etc., forming a printed pattern with the ink on a substrate, and making the printed pattern conductive. In accordance with needs, metal having a shape other than the fiber-shape and the wire-shape, may be used. In particular, when a silver nanowire ink is used for producing a transparent conductive pattern, because silver has a large surface area per unit mass and the insulation reliability of fine wires, etc., thereof is low at a high temperature and high humidity, protection by the protective film ink according to the above aspect is effective. Further, the shape of the conductive pattern is not limited, and may be a shape of the wire or electrode pattern formed on the substrate, or a pattern as a film (solid paint) entirely or partly covering the substrate, and the like.

EXAMPLES

Hereinbelow, specific examples of the present disclosure will be specifically explained. The examples are described below for the purpose of easy understanding of the present disclosure, and the present disclosure is not limited to these examples.

Synthesis Example of (A) Polyurethane Containing Carboxyl Group

Synthesis Example 1

16.7 g of C-1015N (polycarbonate diol, molar ratio of raw material diols: 1,9-nonanediol:2-methyl-1,8-octanediol=15: 85, molecular weight: 964, manufactured by Kuraray Co., Ltd.) as a polyol compound, 10.8 g of 2,2-dimethylol butanoic acid (manufactured by Huzhou Changsheng Chemical Co., Ltd.) as a dihydroxyl compound containing a carboxyl group, and 62.6 g of propylene glycol monomethyl ether acetate (PGMEA) (manufactured by Showa Denko K. K.) as a solvent were provided in a 2 L three-neck flask having a stirrer, a thermometer, and a condenser, and the 2,2-dimethylol butanoic acid was dissolved at 90° C.

The temperature of the reaction liquid was lowered to 70° C., and 23.5 g of Desmodur (registered trademark)-W (bis (4-isocyanate cyclohexyl)methane), manufactured by Sumika Covestro Urethane Co., Ltd.) as polyisocyanate was dropped thereto for 30 minutes by a dropping funnel. After the dropping was complete, the temperature was raised to 100° C., and the reaction was performed at 100° C. for 15 hours. After the confirmation by IR that almost all of the isocyanate disappeared, 0.5 g of isobutanol was added, which was further reacted at 100° C. for 6 hours. The obtained carboxyl group-containing polyurethane had a weight average molecular weight of 33500, and a resin solution thereof had an acid value of 39.4 mgKOH/g.

Synthesis Example 2

37.0 g of C-1015N (polycarbonate diol, molar ratio of raw material diols: 1,9-nonanediol:2-methyl-1,8-octanediol=15: 85, molecular weight: 964, manufactured by Kuraray Co., Ltd.) as a polyol compound, 20.7 g of 2,2-dimethylolpropionic acid (manufactured by Perstorp Japan Co., Ltd.) as a dihydroxyl compound containing a carboxyl group, and 132.1 g of propylene glycol monomethyl ether acetate (manufactured by Showa Denko K. K.) as a solvent were provided in a 2 L three-neck flask having a stirrer, a thermometer, and a condenser, and 2,2-dimethylolpropionic acid was dispersed at 90° C.

The temperature of the reaction liquid was lowered to 70° C., and 50.3 g of Desmodur (registered trademark)-W (bis (4-isocyanate cyclohexyl)methane), manufactured by Sumika Covestro Urethane Co., Ltd.) as polyisocyanate was dropped thereto for 30 minutes by a dropping funnel. After the dropping was complete, the temperature was raised to 100° C., and the reaction was performed at 100° C. for 15 hours. After the confirmation by IR that almost all of the isocyanate disappeared, 0.5 g of isobutanol was added, which was further reacted at 100° C. for 6 hours. The obtained carboxyl group-containing polyurethane had a weight average molecular weight of 35000, and a resin solution thereof had an acid value of 37.4 mgKOH/g.

Production of Protective Film Ink

Example 1

As shown in Table 1, 1.8 g of the resin solution obtained by Synthesis Example 1 as (A) polyurethane containing a carboxyl group (in Table 1, expressed as urethane), 0.15 g of jER (registered trademark)-604 (N,N,N',N'-tetraglycidyl diaminodiphenyl methane type epoxy compound, manufactured by Mitsubishi Chemical Corporation) as (B) epoxy compound, 0.048 g of SA102 (DBU octyl acid salt) (manufactured by San-Apro Ltd.) as (C) curing accelerator, and 31.78 g of isopropyl alcohol (IPA) and diethylene glycol monoethyl ether (EC) (IPA:EC=60:37 (mass ratio)) as (D) solvent, were added, which was stirred to become uniform by using Awatori Rentaro (registered trademark) ARV-310, i.e., a planetary centrifugal vacuum mixer manufactured by Thinky Corporation. Thereby, the protective film ink according to Example 1 was obtained. According to the calculation using masses before and after the solvent drying, the protective film ink had a solid content (total of (A) polyurethane containing a carboxyl group, (B) epoxy compound, and (C) curing accelerator) of 3% by mass.

Examples 2 to 10, Comparative Examples 1 to 9

(A) polyurethane containing a carboxyl group, (B) epoxy compound, (C) curing accelerator, (D) solvent shown in Table 1 were used, and same operations as Example 1 were performed, and thereby, respective protective film inks were obtained. The amounts of the solvents were adjusted for the inks other than the inks having the solid content of 3% by mass, so that the objected concentrations can be obtained, respectively.

Note that in Table, (B) epoxy compound, 2021P refers to Celloxide (registered trademark) 2021P, a bifunctional alicyclic epoxy compound (3',4'-epoxy cyclohexyl methyl 3,4-epoxy cyclohexane carboxylate) manufactured by Daicel Corporation, EHPE (registered trademark) 3150 refers to 1,2-epoxy-4-(2-oxiranyl) cyclohexane adduct of 2,2-bis(hydroxy methyl)-1-butanol, manufactured by Daicel Corporation, BADG refers to bisphenol A diglycidyl ether (manufactured by Showa Denko K. K.), and Epolite 4000 refers to hydrogenated bisphenol A diglycidyl ether (manufactured by Kyoeisha Chemical Co., Ltd.). Also, as (D) solvent, PGME refers to propylene glycol monomethyl ether (manufactured by Showa Denko K. K.).

Table 1 shows the solubility of the obtained ink. Here, the solubility is a result of visual observation as to whether (A) polyurethane containing a carboxyl group, (B) epoxy compound, and (C) curing accelerator became a uniform clear solution having a predetermined concentration. When the ink is transparent by visual observation, "good" is inserted, and when to become clouded or precipitation of resin was observed, "poor" is inserted. With reference to Comparative Example 3 and Comparative Example 5, even if a solvent containing a hydroxyl group, such as isopropyl alcohol (IPA), is used, if a solution, the solubility of the resin to which is low, is contained in the solvent at a content of 70% by mass or more, uniform solution cannot be obtained.

<Production of Silver Nanowire>

Polyvinylpyrrolidone K-90 (manufactured by Nippon Shokubai Co., Ltd.) (0.98 g), $AgNO_3$ (1.04 g), and $FeCl_3$ (0.8 m g) were dissolved in ethylene glycol (250 ml), and heated and reacted at 150° C. for 1 hour. The obtained silver nanowire coarse dispersion liquid is dispersed in 2000 ml of methanol, and poured in a desktop small tester (using a ceramic membrane filter Cefilt, membrane area: 0.24 $m^2$, pore size: 2.0 μm, sizeΦ: 30 mm*250 mm, differential pressure of filter: 0.01 MPa, manufactured by NGK Insulators, Ltd.), and impurities were removed by cross-flow filtration at a circulation flow rate of 12 L/min, and a dispersion liquid temperature of 25° C. Thereafter, the obtained dispersion liquid was condensed, and appropriate amount of methanol was added so that the calculated silver concentration became approximately 0.2% by mass. A part (10 g) of the methanol dispersion liquid was weighed in a PFA container, and dried by heating at 100° C. for 6 hours. The solid after the drying was heated by a thermogravimetric analyzer (differential thermal analyzer: TG-DTA2000SE, manufactured by NETZSCH) at a heating rate of 10° C./min to 500° C. The residue at 500° C. was treated as a mass of silver, and the component amount in the dispersion liquid was simply measured. As a result, the obtained silver nanowire methanol dispersion liquid had a silver concentration of 0.2% by mass, with silver nanowires having an average diameter of 36 nm, and an average length 20 μm. The average diameter and the average length of the silver nanowires were arithmetic average values obtained by observing 500 silver nanowires by SEM. Further, the abovementioned methanol, ethylene glycol, $AgNO_3$, and $FeCl_3$ were the ones manufactured by Wako Pure Chemical Industries, Ltd.

<Printing Silver Nanowire Ink Coating Film>

174 g of the silver nanowire methanol dispersion liquid produced as above (silver concentration: 0.2% by mass, dispersion medium: methanol, average diameter of wire: 36 nm, average length of wire: 20 μm) was weighed in a 1000 ml eggplant flask. 3.1 g of 10% by mass aqueous solution of PVP K-90 (poly(N-vinylpyrrolidone), manufactured by Nippon Shokubai Co., Ltd.), 40.9 g of propylene glycol (manufactured by Wako Pure Chemical Industries, Ltd.), and 112.3 g of PGME (manufactured by Tokyo Chemical Industry Co., Ltd.) were added to the flask, and dispersed well. Then, methanol was distilled away from the mixture using an evaporator. Thereafter, 63.2 g of pure water, 300 g of ethanol (manufactured by Kanto Chemical Co., Inc.), and 49.3 g of methanol (manufactured by Wako Pure Chemical Industries, Ltd.) were added. The resultant was stirred by the planetary centrifugal vacuum mixer, Awatori Rentaro (registered trademark) ARV-310, manufactured by Thinky Corporation, to thereby obtain a silver nanowire ink.

The obtained silver nanowire ink has a silver concentration of 0.23% by mass (measured by AA280Z, Zeeman atomic absorption spectrophotometer, manufactured by Varian), and the concentration of the remaining methanol was 9.3% by mass. The measurement of concentration was performed by gas chromatography using Gas Chromatograph 7890A manufactured by Agilent Technologies Inc.

Using the above silver nanowire ink, a 20-cm-square solid printed film (silver nanowire layer) was printed on a COP film (ZEONOR (registered trademark) ZF14, 50 μm thick, manufactured by Zeon Corporation) having a plasma treated surface, by a slit coater (FLOLIA (registered trademark), manufactured by Chugai Ro Co., Ltd.). The plasma treatment was performed under the air atmosphere, at the power output of 405 V for 3 seconds, using AP-T03 AtomosPheric High-density Plasma Cleaning System, manufactured by Sekisui Chemical Co., Ltd. After performing the solvent drying at 100° C., for 10 minutes, the obtained transparent conductive pattern had a surface resistance of 60Ω/□. The surface resistance was measured using a non-contact type resistance measurement instrument (EC-80P, manufactured by Napson Corporation) and a contact type resistance measurement instrument (Loresta GP MCP-T610, manufactured by Mitsubishi Chemical Analytech Co., Ltd.).

<Printing Protective Film Ink>

Each of the protective film inks according to Examples 1 to 10 and Comparative Examples 1 to 9 was printed to cover the produced 20-cm-square solid printed film, by the abovementioned slit coater, and was subjected to thermal curing at 100° C., for 10 minutes, to form a protective film. In Comparative Example 2, the thermal curing was performed at 100° C., for 60 minutes. In Table 1, the productivity evaluation, "good" is inserted for the cases that the thermal curing was performed at 100° C., for 10 minutes, and "poor" is inserted for the cases that the thermal curing was performed at a higher temperature or for a longer time (100° C., 60 minutes).

According to the SEM observation of the cross-sectional surface, using JSM-7500FA, manufactured by JEOL Ltd., in Example, the total thickness of the silver nanowire layer and the cured protective film was approximately 100 nm; in Comparative Example 6, approximately 200 nm; in Comparative Example 7, approximately 500 nm; and in Comparative Example 8, approximately 1 μm.

<Evaluation of Protective Film>

The cure degree, contact resistance, reliability, and optical property of the obtained protective films were measured by the following methods. Table 1 shows the results.

Cure Degree: Calculated by the above-mentioned ATR measurement. For the ATR measurement, Nicolet 6700, manufactured by Thermo Scientific K. K. was used.

Contact Resistance: Measured by Loresta GP MCP-T610, manufactured by Mitsubishi Chemical Analytech Co., Ltd. The measurement was performed at arbitrarily selected 10 points on the protective film. When resistance could be measured at all measurement points, the film was evaluated as "good"; resistance could be measured at some of the points, the film was evaluated as "fair"; and resistance could not be measured at any of the points, the film was evaluated as "poor".

Reliability: In a thermo-hygrostat chamber maintained at 85° C., 85%, if the change in resistance after 500 hours passed was 10% or less, the reliability was evaluated as "good", if the change exceeds 10% and 20% or less, evaluated as "fair", and if the change exceeds 20%, evaluated as "poor".

Optical Property: In a thermo-hygrostat chamber maintained at 85° C., 85%, if the change in haze and total light transmittance of the film measured (by Haze meter NDH 2000 (manufactured by Nippon Denshoku Industries Co., Ltd.)) after 500 hours passed was both 10% or less, the optical property was evaluated as "good", if either of them exceeds 10% and 20% or less, evaluated as "fair", if both exceeds 20%, evaluated as "poor".

On the basis of the above results, the protective films were evaluated. Table 1 shows the results. If all of the contact resistance, reliability, and the optical property, as well as the above-mentioned productivity, were evaluated as "good the protective film was evaluated as "good"; at least one of them was "fair" and none of them was "poor", evaluated as "fair"; and at least one of them was "poor", evaluated as "poor.

TABLE 1

| | (A) Urethane | | (B) Epoxy compound | | (C) Curing accelerator | | Solid content (mass %) | (D) Solvent | | | | | | Cure degree (%) | Contact resistance | Reliability | Optical property | Productivity | Evaluation |
| | | | | | | | | Amount (mass %) | Mixing ratio (mass ratio) | | | | Solubility | | | | | | |
| | Type | Amount (mass %) | Type | Amount (mass %) | Type | Amount (mass %) | | | IPA | EC | PGME | PGMEA | | | | | | | |
|---|---|---|---|---|---|---|---|---|---|---|---|---|---|---|---|---|---|---|---|
| Ex. 1 | Syn. Ex. 1 | 2.44 | jER6C4 | 0.42 | SA102 | 0.14 | 3 | 97 | 60 | 37 | | 3 | good | 72 | good | good | good | good | good |
| Ex. 2 | Syn. Ex. 1 | 2.44 | jER6C4 | 0.42 | SA102 | 0.14 | 3 | 97 | 50 | 47 | | 3 | good | 65 | good | good | good | good | good |
| Ex. 3 | Syn. Ex. 1 | 2.44 | jER6C4 | 0.42 | SA102 | 0.14 | 3 | 97 | 40 | 57 | | 3 | good | 58 | good | good | good | good | good |
| Ex. 4 | Syn. Ex. 1 | 2.44 | jER6C4 | 0.42 | SA102 | 0.14 | 3 | 97 | 40 | | 57 | 3 | good | 67 | good | good | good | good | good |
| Ex. 5 | Syn. Ex. 1 | 2.40 | 2021P | 0.45 | SA102 | 0.14 | 3 | 97 | 50 | 47 | | 3 | good | 78 | good | good | good | good | good |
| Ex. 6 | Syn. Ex. 1 | 2.27 | EHPE3150 | 0.59 | SA102 | 0.14 | 3 | 97 | 50 | 47 | | 3 | good | 65 | good | good | good | good | good |
| Ex. 7 | Syn. Ex. 1 | 2.31 | BADG | 0.54 | SA102 | 0.14 | 3 | 97 | 60 | 37 | | 3 | good | 51 | good | good | good | good | good |
| Ex. 8 | Syn. Ex. 1 | 2.14 | Epolite 400C | 0.72 | SA102 | 0.14 | 3 | 97 | 50 | 47 | | 3 | good | 69 | good | good | good | good | good |
| Ex. 9 | Syn. Ex. 1 | 2.43 | jER6C4 | 0.43 | SA102 | 0.14 | 3 | 97 | 50 | 47 | | 3 | good | 71 | good | good | good | good | good |
| Ex. 10 | Syn. Ex. 2 | 2.43 | jER6C4 | 0.43 | SA102 | 0.14 | 3 | 97 | 30 | 67 | | 3 | good | 47 | good | good | good | good | good |
| Comp. Ex. 1 | Syn. Ex. 1 | 2.44 | jER6C4 | 0.42 | SA102 | 0.14 | 3 | 97 | 0 | 97 | | 3 | good | 24 | good | poor | fair | good | poor |
| Comp. Ex. 2 | Syn. Ex. 1 | 2.44 | jER6C4 | 0.42 | SA102 | 0.14 | 3 | 97 | 0 | 97 | | 3 | good | 69 | good | good | good | poor | poor |
| Comp. Ex. 3 | Syn. Ex. 1 | 2.44 | jER6C4 | 0.42 | SA102 | 0.14 | 3 | 97 | 70 | 27 | | 3 | poor | — | — | — | — | — | poor |
| Comp. Ex. 4 | Syn. Ex. 1 | 2.44 | jER6C4 | 0.42 | SA102 | 0.14 | 3 | 97 | 20 | 77 | | 3 | good | 34 | good | poor | fair | good | poor |
| Comp. Ex. 5 | Syn. Ex. 1 | 2.44 | jER6C4 | 0.42 | SA102 | 0.14 | 3 | 97 | 97 | 0 | | 3 | poor | — | — | — | — | — | poor |
| Comp. Ex. 6 | Syn. Ex. 1 | 4.07 | jER6C4 | 0.70 | SA102 | 0.23 | 5 | 95 | 0 | 95 | | 5 | good | 25 | fair | poor | fair | good | poor |
| Comp. Ex. 7 | Syn. Ex. 1 | 8.13 | jER6C4 | 0.14 | SA102 | 0.47 | 10 | 90 | 0 | 90 | | 10 | good | 31 | poor | poor | fair | good | poor |
| Comp. Ex. 8 | Syn. Ex. 1 | 24.4 | jER6C4 | 4.20 | SA102 | 1.40 | 30 | 70 | 0 | 70 | | 30 | good | 70 | poor | good | good | good | poor |
| Comp. Ex. 9 | Syn. Ex. 1 | 2.44 | jER6C4 | 0.42 | SA102 | 0.14 | 3 | 97 | 0 | | 97 | 3 | good | 44 | good | fair | fair | good | fair |

As can be seen from the results shown in Table 1, comparison among Examples 1 to 4, Comparative Example 1, and Comparative Examples 3 to 5 reveals that if IPA, the solubility of (A) polyurethane containing a carboxyl group to which is low, is contained 70% by mass or more, the ink cannot be uniform. Further, the smaller the IPA ratio, the lower the cure degree, and when the cure degree becomes less than 45, the result of the reliability becomes worse.

Comparative Example 2 is different from Comparative Example 1 in the point that the curing conditions were changed from 100° C. and 10 minutes to 100° C. and 60 minutes. The sufficient heating leads to the increase of the cure degree, and the improvement of the reliability. This reveals that the result of reliability depends on the cure degree. However, when heating is performed for a long time, the productivity is decreased.

The solid content of the ink is different between Comparative Examples 6 to 8 and Comparative Example 1. As in Comparative Example 8, if the solid content is high, namely, if the amount of solvent is small, the vaporization heat when solvent evaporates is small. Thus, even under the curing conditions of 100° C. and 10 minutes, the cure degree becomes higher, and a reliable protective film can be obtained. However, the film thickness becomes large, and thus, the contact resistance cannot be obtained. Accordingly, when a dilute ink is used, the composition of the solvent becomes very important.

In each of Example 4 and Comparative Example 9, the solvent of the ink includes PGME instead of EC, PGME having a lower boiling point than EC. In both cases, the cure degrees of the inks are higher than the corresponding inks. This suggests that the boiling point of the solvent is an important factor. In Comparative Example 9, the ink does not include (D2) solvent having the boiling point of 100° C. or lower, and thus, the added heat is used for the evaporation of the solvent, and thus, the cure degree becomes low, and the reliability becomes worse.

In Examples 5 to 8, the epoxy resins in the ink are changed in various ways, on the basis of Example 2. In view of them, it can be found that, even if the epoxy resin is changed, the cure degree is important for the reliability.

In Example 9 and Example 10, the polyurethane containing a carboxyl group is changed. Judging from the cure degrees of Example 2 and Example 9, it is assumed that the reactivity of the carboxyl group becomes higher, compared to the case where the polyurethane according to Synthesis Example 1 is used.

In view of the above, it is suggested that, as a protective film composition used for a transparent conductive film, capability of obtaining a high cure degree at a low energy and for a short time is important, and that selecting an appropriate solvent (type, amount) is important in order to obtain the cure degree control, and a superior contact resistance and reliability.

The invention claimed is:

1. A composition for a protective film for a conductive pattern, comprising
    (A) a polyurethane containing a carboxyl group,
    (B) an epoxy compound,
    (C) a curing accelerator, and
    (D) solvent,
    wherein the content of the solvent (D) is 95.0% by mass or more and 99.9% by mass or less of the total composition,
    (D) comprises (D1) and (D2), (D1) being a solvent having a boiling point exceeding 100° C. and containing a hydroxyl group, (D2) being a solvent having a boiling point of 100° C. or lower, and the content of the solvent (D2) having the boiling point of 100° C. or lower is 30% by mass or more and less than 70% by mass of the solvent in total.

2. A composition for a protective film for a conductive pattern according to claim 1, wherein (D1) solvent having the boiling point exceeding 100° C. and containing a hydroxyl group is at least one selected from a group consisting of propylene glycol monomethyl ether, diethylene glycol monomethyl ether, diethylene glycol monoethyl ether, diethylene glycol monobutyl ether, triethylene glycol, and ethyl lactate.

3. A composition for a protective film for a conductive pattern according to claim 1, wherein (D2) solvent having the boiling point of 100° C. or lower is at least one selected from a group consisting of propylene glycol dimethyl ether, isopropyl alcohol, t-butyl alcohol, and methyl ethyl ketone.

4. A composition for a protective film for a conductive pattern according to claim 2, wherein (D2) solvent having the boiling point of 100° C. or lower is at least one selected from a group consisting of propylene glycol dimethyl ether, isopropyl alcohol, t-butyl alcohol, and methyl ethyl ketone.

5. A composition for a protective film for a conductive pattern according to claim 2, wherein (D1) solvent having the boiling point exceeding 100° C. and containing a hydroxyl group is at least one of diethylene glycol monoethyl ether (EC) and propylene glycol monomethyl ether (PGME).

6. A composition for a protective film for a conductive pattern according to claim 3, wherein (D2) solvent having the boiling point of 100° C. or lower is isopropyl alcohol (IPA).

7. A protective film for a conductive pattern which is made of a cured product of the composition for the protective film for the conductive pattern according to claim 1, and which has a cure degree of 45 or more.

8. A method for producing a protective film, wherein the composition for the protective film for the conductive pattern according to claim 1 is cured at a temperature of 100° C. or lower and for a heating time of 10 minutes or less.

9. A method for producing a transparent conductive film comprising a step of forming the protective film on the transparent conductive film by the method according to claim 7.

10. A composition for a protective film for a conductive pattern according claim 1, wherein (A) polyurethane containing a carboxyl group is polyurethane synthesized by using (a1) a polyisocyanate compound, (a2) a polyol compound, and (a3) a dihydroxy compound containing a carboxyl group, as monomers, (a1) being an alicyclic compound having 6 to 30 carbon atoms other than the carbon atoms in the isocyanato group (—NCO group), (a2) being either polycarbonate polyol or polybutadiene polyol, and (a3) being either 2,2-dimethylolpropionic acid or 2,2-dimethylolbutanoic acid.

11. A composition for a protective film for a conductive pattern according claim 1, wherein (B) epoxy compound having two or more epoxy groups in one molecule is selected from a group consisting of: an amino group-containing epoxy resin, an aliphatic-type epoxy resin containing a glycidyl group, and an alicyclic epoxy resin containing a glycidyl group.

12. A composition for a protective film for a conductive pattern according claim 1, wherein the mixing ratio of (A) polyurethane containing a carboxyl group relative to (B) epoxy compound is 0.5 to 1.5, in terms of equivalent ratio of the carboxyl groups of polyurethane relative to the epoxy groups of (B) epoxy compound, and the used amount of (C) curing accelerator is 0.1 to 10% by mass relative to the total mass of (A) polyurethane containing a carboxyl group and (B) epoxy compound.

13. A composition for a protective film for a conductive pattern according claim 10, wherein (A) polyurethane containing a carboxyl group has an acid value of 10 to 140 mg-KOH/g.

* * * * *